US012136271B2

(12) United States Patent
Yu et al.

(10) Patent No.: US 12,136,271 B2
(45) Date of Patent: Nov. 5, 2024

(54) LONG-RANGE OBJECT DETECTION, LOCALIZATION, TRACKING AND CLASSIFICATION FOR AUTONOMOUS VEHICLES

(71) Applicant: WAYMO LLC, Mountain View, CA (US)

(72) Inventors: Ruichi Yu, Mountain View, CA (US); Kang Li, Sammamish, WA (US); Tao Han, Sunnyvale, CA (US); Robert Cosgriff, San Francisco, CA (US); Henrik Kretzschmar, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 483 days.

(21) Appl. No.: 17/319,194

(22) Filed: May 13, 2021

(65) Prior Publication Data

US 2022/0366175 A1    Nov. 17, 2022

(51) Int. Cl.
*G06V 20/58*   (2022.01)
*G01S 13/931*  (2020.01)
(Continued)

(52) U.S. Cl.
CPC ............ *G06V 20/58* (2022.01); *G01S 13/931* (2013.01); *G01S 17/931* (2020.01); *G05D 1/0088* (2013.01); *G05D 1/0251* (2013.01); *G06F 18/22* (2023.01)

(58) Field of Classification Search
CPC ...... G06V 20/58; G06V 10/255; G06V 20/64; G01S 13/931; G01S 17/931; G01S 17/86;
(Continued)

(56) References Cited

U.S. PATENT DOCUMENTS 9,062,979 B1 *   6/2015   Ferguson .............. G01S 17/875
9,868,446 B1 *   1/2018   Zhu ........................ G01S 17/86
(Continued)

OTHER PUBLICATIONS

"Autonomous Driving: The Good, The Bad and The Ugly", NVIDIA, GTC CPU Technology Conference 2019, https://on-demand-gtc.gputechconf.com/gtcnew/sessionview.php?sessionName=s9555-autonomous+driving%3a+the+good%2c+the+bad+and+the+ugly, downloaded from the internet, Mar. 19, 2021, pp. 1-3.

*Primary Examiner* — Ping Y Hsieh
*Assistant Examiner* — Vaisali Rao Koppolu
(74) *Attorney, Agent, or Firm* — Botos Churchill IP Law

(57) ABSTRACT

Aspects of the disclosure relate to controlling a vehicle. For instance, using a camera, a first camera image including a first object may be captured. A first bounding box for the first object and a distance to the first object may be identified. A second camera image including a second object may be captured. A second bounding box for the second image and a distance to the second object may be identified. Whether the first object is the second object may be determined using a plurality of models to compare visual similarity of the two bounding boxes, to compare a three-dimensional location based on the distance to the first object and a three-dimensional location based on the distance to the second object, and to compare results from the first and second models. The vehicle may be controlled in an autonomous driving mode based on a result of the third model.

21 Claims, 12 Drawing Sheets

(51) Int. Cl.
*G01S 17/931* (2020.01)
*G05D 1/00* (2006.01)
*G06F 18/22* (2023.01)

(58) Field of Classification Search
CPC ... G01S 13/865; G01S 13/867; G05D 1/0088; G05D 1/0251; G05D 2201/0213; G06F 18/22; B60W 30/18163; B60W 2420/42; B60W 2420/52; B60W 60/001; B60W 30/08

See application file for complete search history.

(56) References Cited

U.S. PATENT DOCUMENTS

| | | | |
|---|---|---|---|
| 9,937,924 | B1 | 4/2018 | Ferguson |
| 10,013,773 | B1 * | 7/2018 | Ogale .................... G06N 3/084 |
| 10,410,096 | B2 | 9/2019 | Dijkman et al. |
| 10,422,649 | B2 | 9/2019 | Engelman et al. |
| 10,832,063 | B2 | 11/2020 | Shashua et al. |
| 10,916,134 | B2 | 2/2021 | Gesch et al. |
| 11,010,907 | B1 * | 5/2021 | Bagwell ............... G05D 1/0221 |
| 2019/0147610 | A1 * | 5/2019 | Frossard ................ G06N 3/045 |
| | | | 382/103 |
| 2019/0266418 | A1 | 8/2019 | Xu et al. |
| 2019/0311616 | A1 | 10/2019 | Jin et al. |
| 2020/0034976 | A1 | 1/2020 | Stone et al. |
| 2020/0065665 | A1 * | 2/2020 | Nageshrao ............... G06N 3/08 |
| 2020/0202714 | A1 * | 6/2020 | Gesch .................... B60W 50/14 |
| 2021/0237761 | A1 * | 8/2021 | Das ......................... G06T 7/248 |
| 2021/0263525 | A1 * | 8/2021 | Das ......................... G06N 3/084 |
| 2022/0101020 | A1 * | 3/2022 | Evans .................... G06N 3/044 |

* cited by examiner

LONG-RANGE OBJECT DETECTION, LOCALIZATION, TRACKING AND CLASSIFICATION FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect and respond to objects in the surroundings. For example, autonomous vehicles may include sonar, radar, camera, LIDAR, and other devices that scan and record data from the vehicle's surroundings.

Typically object detection using LIDAR may be reliable at distances within 100 meters or less, there may be many instances where detection of objects beyond this range is critical. For example, when an autonomous vehicle is driving on a highway at 65 miles per hour, an object detected at 100 meters would be passed by in under 4 seconds. This gives very little time for the autonomous vehicle to change lanes, an action which may be necessary in certain jurisdictions which require that vehicles change lanes to move away from a vehicle stopped on a shoulder area, etc. In addition, the range of forward-facing LIDAR on an autonomous vehicle may be substantially less than the range of high-resolution cameras. Moreover, for certain types of vehicles, such as class 8 trucks (e.g. tractor-trailers), forward-facing LIDARs may be more likely to become occluded by other larger objects (e.g. other tractor trailers).

BRIEF SUMMARY

Aspects of the disclosure provide a method of controlling a vehicle. The method includes capturing, by one or more processors, using a camera, a first camera image including a first object; capturing, by the one or more processors, using the camera, a second camera image including a second object; identifying, by the one or more processors, a first bounding box for the first object and a distance to the first object; identifying, by the one or more processors, a second bounding box for the second camera image and a distance to the second object; determining, by the one or more processors, whether the first object is the second object using a first model to compute visual similarity for the first bounding box and the second bounding box, a second model to compare a three-dimensional location based on the distance to the first object and a three-dimensional location based on the distance to the second object, and a third model to compare results from the first model and the second model; and controlling, by the one or more processors, the vehicle in an autonomous driving mode based on a result of the third model.

In one example, identifying the first bounding box and the distance to the first object includes using a machine learning model. In another example, identifying the distance to the first object is based on only the first image. In another example, the second camera image is captured immediately after the first image. In another example, the first image is captured when the first object is located beyond a range of LIDAR sensors of the vehicle. In another example, the first image is captured when the first object is located beyond a range of radar sensors of the vehicle. In another example, controlling the vehicle further includes changing lanes in response to the result of the third model. In another example, the result of the third model is a value indicative of similarity of the first object and the second object, and the method further comprises comparing the value to a threshold, and wherein controlling the vehicle is further based on the comparison of the value to the threshold. In this example, the method also includes, based on the comparison of the value to the threshold, identifying the first object and the second object as a same object and tracking the same object over time. Alternatively, based on the comparison of the value to the threshold, identifying the first object and the second object as different objects and tracking the first object and the second object independently over time. In another example, the first model is a convolutional neural network, the second model is a multilayer perceptron model, and the third model is a multilayer perceptron model. In another example, the method also includes, based on the results of the third mode, generating a track for an object using the first image and the second camera image, the track identifying changes in the object's location over time and determining whether the object is a stopped vehicle on a shoulder area using a classifier and the track. In this example, controlling the vehicle in an autonomous driving mode is further based on the determination of whether the object is a stopped vehicle on a shoulder area. In addition, controlling the vehicle includes causing the vehicle to change lanes to move away from the stopped vehicle. In addition or alternatively, the method also includes identifying an additional track for the object generated using a LIDAR sensor and converting the track and the additional track into an embedding, and wherein determining whether the object is a stopped vehicle on a shoulder area further includes inputting the embedding into the classifier. In addition or alternatively, the method also includes converting the track into an embedding, and wherein determining whether the object is a stopped vehicle on a shoulder area further includes inputting the embedding into the classifier. In this example, when an additional track for the object generated using a LIDAR sensor is not available, the embedding includes a zero value for tracks generated using a LIDAR sensor. In addition or alternatively, the track further includes speed of the object at different points in time. In addition or alternatively, the classifier generates an output value, and the method further comprises, comparing the output value to a threshold, and wherein controlling the vehicle is further based on the comparison of the output value to the threshold. In addition or alternatively, the classifier is a decision tree. In this example, the classifier is a random forest machine learning algorithm.

DETAILED DESCRIPTION

Overview

Figure 1:
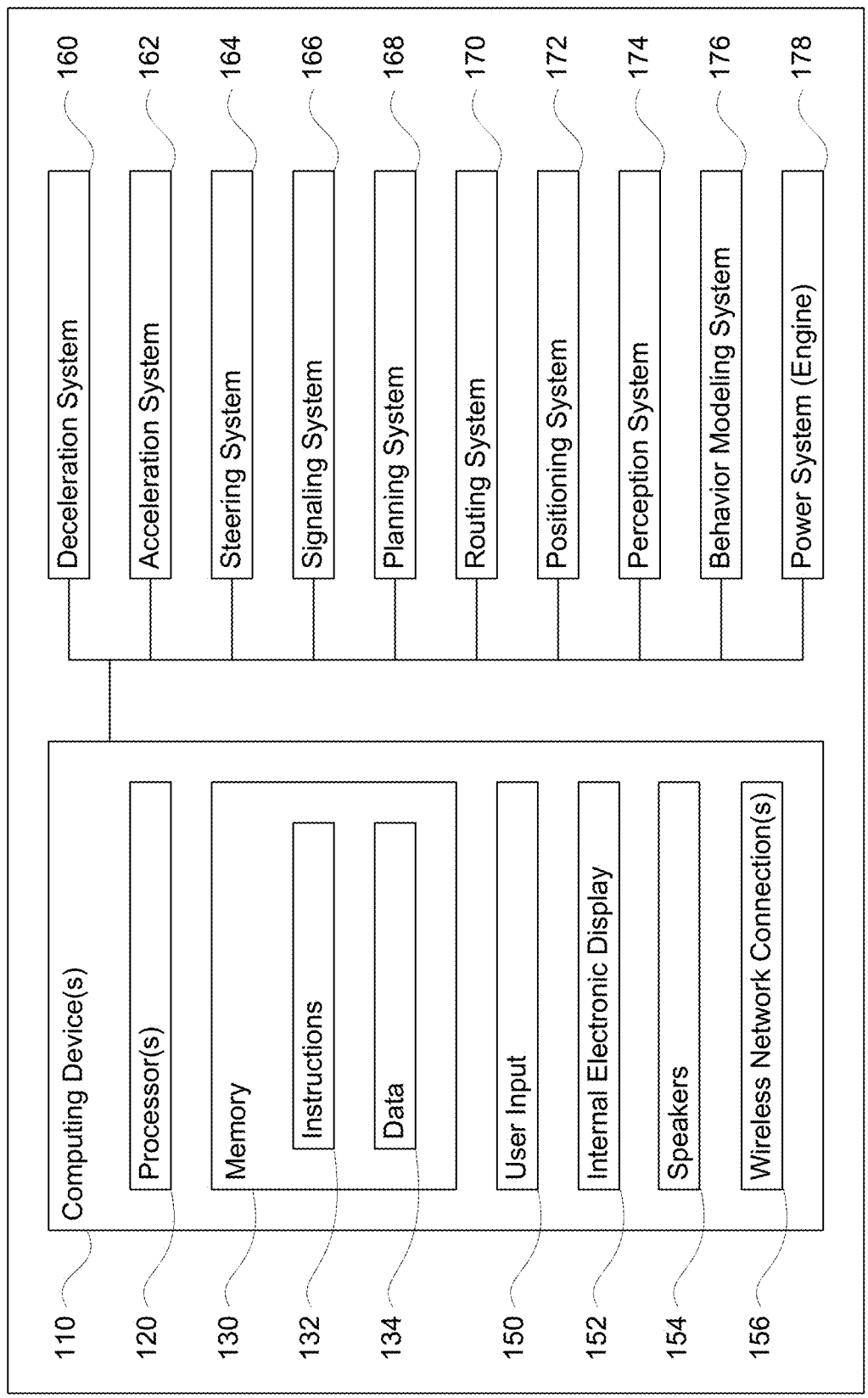
FIG. 1 is a functional diagram of an example vehicle in accordance with an exemplary embodiment.

The technology relates to long-range detection of objects utilizing high-resolution cameras for autonomous vehicles. As noted above, while typically object detection using LIDAR may be reliable at distances within 100 meters or less, there may be many instances where detection of objects beyond this range is critical. For example, when an autonomous vehicle is driving on a highway at 65 miles per hour, an object detected at 100 meters would be passed by in under 4 seconds. This gives very little time for the autonomous vehicle to change lanes, an action which may be necessary in certain jurisdictions which require that vehicles change lanes to move away from a vehicle stopped on a shoulder area, etc. In addition, the range of forward-facing LIDAR on an autonomous vehicle may be substantially less than the range of high-resolution cameras. Moreover, for certain types of vehicles, such as class 8 trucks (e.g. tractor-trailers), forward-facing LIDARs may be more likely to become occluded by other larger objects (e.g. other tractor trailers). In this regard, an approach that detects and tracks objects at longer ranges using camera images and then eventually does the same utilizing data from other sensors (such as LIDAR and radar) as the vehicle gets closer to those objects, can be especially useful.

In order for an autonomous vehicle to react to objects at very large distances, or rather those beyond the range of forward-facing LIDAR, the vehicle's perception system may utilize a high-resolution camera to capture images. Using the example above, in order to be able to effectively detect objects and allow an autonomous vehicle to respond to them, e.g. by changing lanes for a vehicle stopped on a shoulder area etc., the camera may be selected such that the resolution of the camera allows the autonomous vehicle's perception system to reliably detect such objects at distances as far as 300 meters away from the autonomous vehicle.

These images may be input into an object identification model which outputs two-dimensional (2D) bounding boxes for objects as well as a predicted depth of the object in the image. This predicted depth of an object may be in camera space, that is a local coordinate system of the camera. The camera's intrinsic and extrinsic values may then be used to convert this depth into a three-dimensional (3D) location for the object.

Once such objects are detected, they may be tracked over time between camera images. In order to identify which objects should be tracked as the same object, a bounding box of an object from a first camera image, that is the portion of the first camera image within the bounding box, may be compared to a bounding box of an object from a second camera image. If the two objects from the two different images are similar enough, these objects may be tracked together as the same object, or a single, tracked object. This may involve capturing and storing a "track" for the object including characteristics generated by the various models such as changes in the object's location, speed, acceleration, etc. over time.

The comparisons may involve utilizing a plurality of models. A first model may be used to compare the visual similarity of the two bounding boxes in order to generate an embedding representative of the same. A second similarity model may be used to compare other features of objects of the bounding boxes, such as their 3D location in order to generate an embedding representative of the same. The embeddings may then be input into a third similarity model in order to generate a value indicative of the similarity of objects of bounding boxes from different images. This value may then be compared to a threshold to determine whether the bounding boxes are "similar enough" to be tracked as a single object (e.g. a tracked object). Once this occurs, the second camera image may then be used to determine additional features such as speed and acceleration which can be incorporated into the embeddings from the second model and thereby also used as input into the third similarity model.

Once a tracked object is identified, the perception system may track the object. This may involve capturing and storing a "track" for the object including characteristics generated by the various models such as changes in the object's location, speed, acceleration, etc. over time. In addition, the perception system may publish an identifier of the object and its characteristics (generated from the camera and/or other sensors) to other systems of the autonomous vehicle.

In order to detect and identify objects at larger distances which may require the vehicle to change lanes as in the example above, a classifier may be used to determine whether a tracked object is a vehicle stopped on a shoulder area. The classifier may utilize not only tracks from the camera images but also tracks from other sensor such as LIDAR or radar once they become available (or rather are identified using the filter discussed above). The classifier may output a value indicative of how likely the object is to be a stationary vehicle on a shoulder area. This value may be compared to a threshold, and the result of the comparison may be used to control the vehicle. Once again, this information may be published by the vehicle's perception system to other systems of the autonomous vehicle.

As noted above, the information published by the perception system may be input into a behavior modeling system in order to generate a behavior prediction for the object. In addition, the autonomous vehicle's planner system may use the information published by the perception system as well as the behavior predictions to respond to the object, for example, by changing lanes in order to abide by the rules of certain jurisdictions which require that vehicles change lanes to move away from a vehicle stopped on a shoulder area, etc.

The features described herein may allow long-range detection of objects utilizing high-resolution cameras for autonomous vehicles. This may be achieved by using "camera first" detection for the initial localization and tracking of objects which can later be fused with information generated by other types of sensors. As noted above, this can be especially useful for detecting objects such as parked vehicles on a shoulder area of a highway and increasing the amount of time during which an autonomous vehicle could change lanes. Such features may also be useful in situations where there is slow traffic ahead, for instance due to construction, a stopped vehicle, debris in the roadway, or an accident, where the autonomous vehicle would need to change lanes, etc.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., highly detailed maps identifying a road network including the shape and elevation of roadways, lane lines, intersections, crosswalks, speed limits, traffic signals, buildings (including types or categories, footprints, number of stories, floors, levels, etc.), signs, real time traffic information (updated as received from a remote computing device, pullover spots, vegetation, or other such objects and information.

Figure 2:
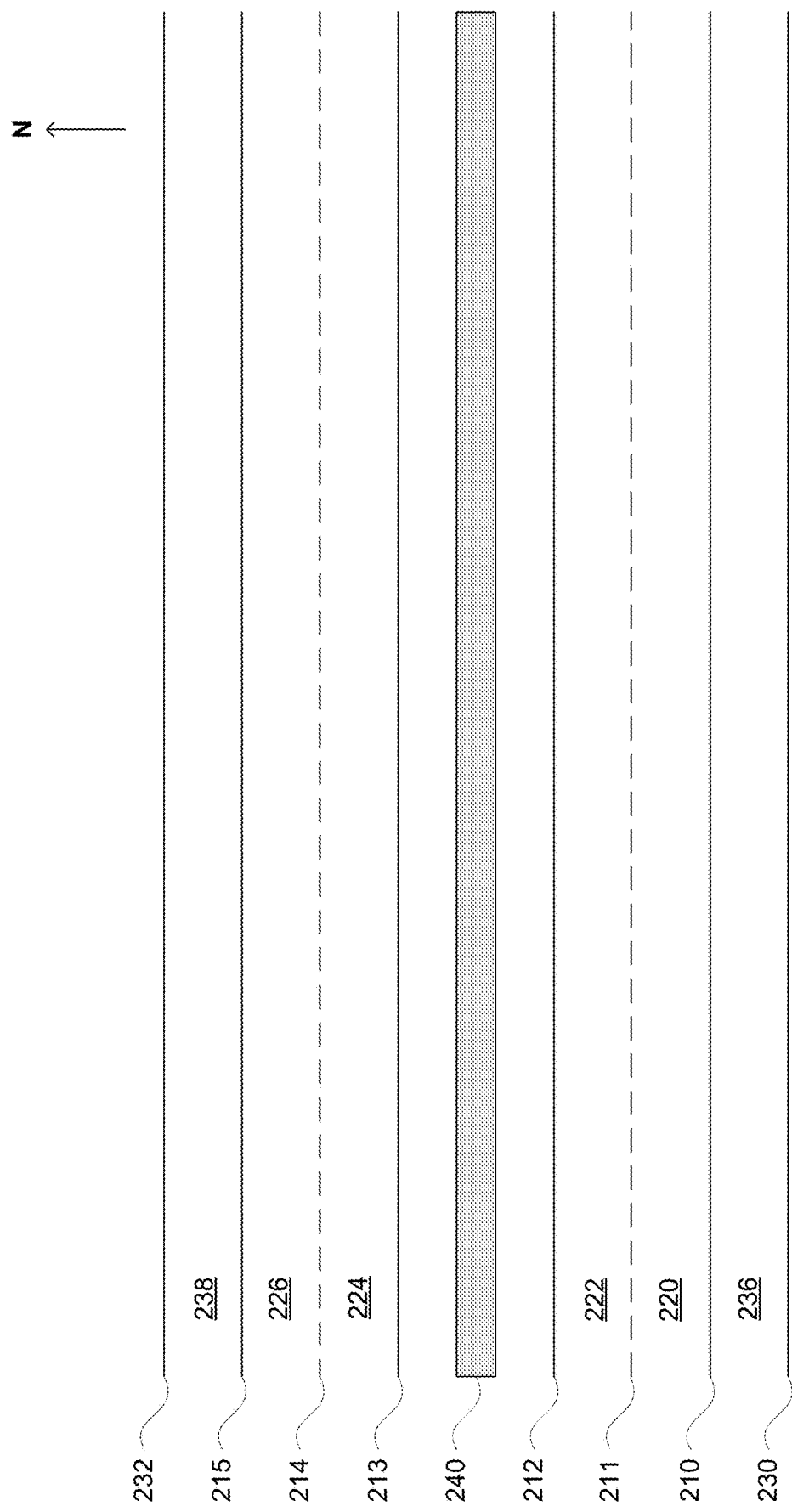
FIG. 2 is an example of map information in accordance with aspects of the disclosure.

FIG. 2 is an example of map information 200 for a section of roadway. FIG. 2 depicts a portion of the map information that includes information identifying the shape, location, and other characteristics of lane markers or lane lines 210, 211, 212, 213, 214, 215, which define the shape and location of lanes 220, 222, 224 226. In addition, the map information includes road edges 230, 232 which may correspond to the edge of the road surface, a curb, wall, railing, etc. Between road edge 230 and lane line 210 (e.g. a fog line), is a shoulder area 236. Similarly, between road edge 232 and lane line 215 (e.g. a fog line) is a shoulder area 238. Dividing the lanes 220, 222 from lanes 224, 226 is a median 240. In this regard, the section of roadway represented in the map information 200 may correspond to a divided highway. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include lasers (e.g. LIDAR sensors), sonar, radar, cameras and/or any other detection devices that record and generate sensor data which may be processed by the computing devices of the vehicle such as the computing devices 110. In the case where the vehicle is a passenger vehicle such as a minivan, the minivan may include a laser or other sensors mounted on the roof or other convenient location.

Figure 3A:
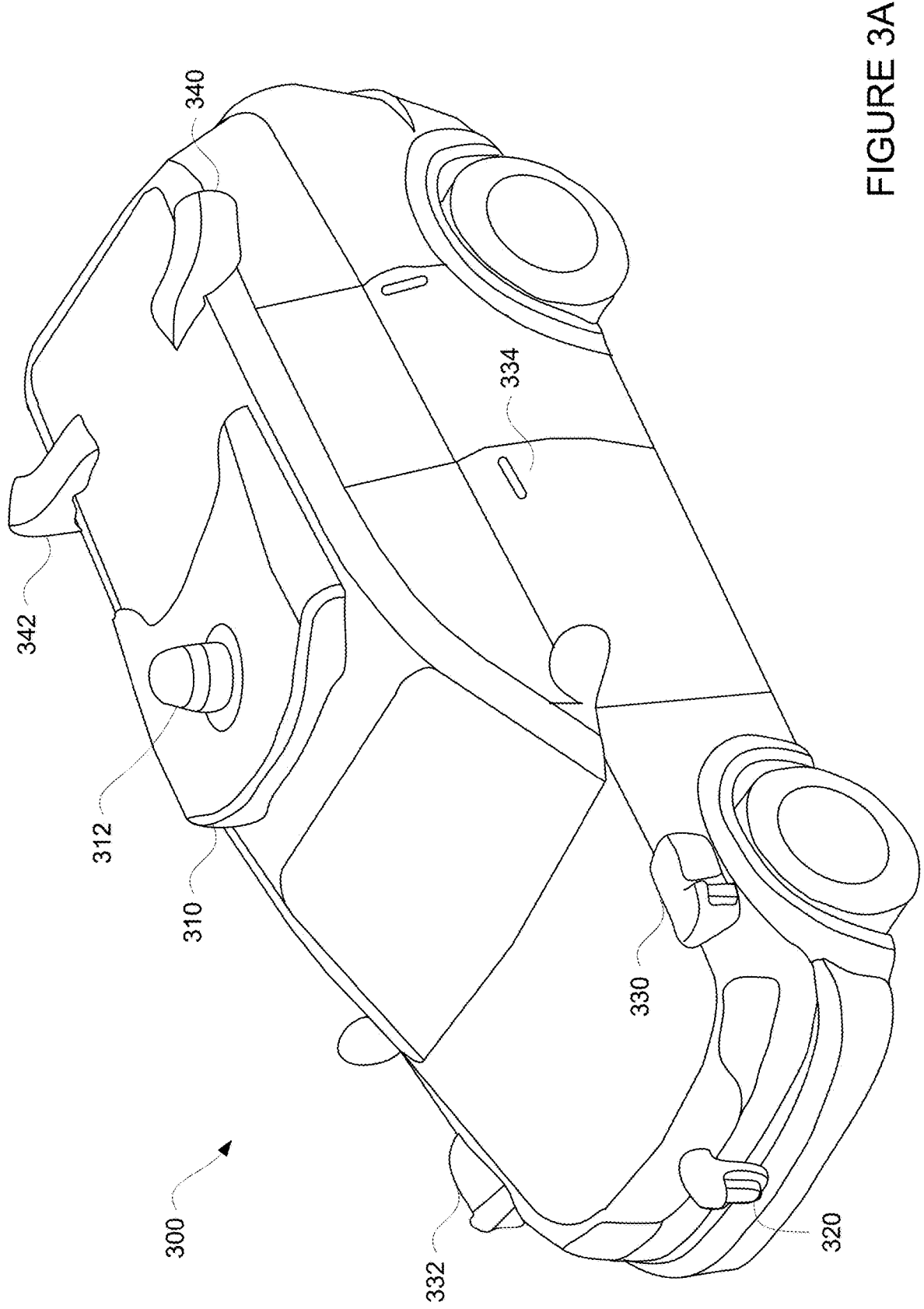
FIG. 3A-3C are example external views of vehicles in accordance with aspects of the disclosure.

For instance, FIG. 3A is an example external view of vehicle 300, such as a passenger vehicle (e.g. a minivan), which may correspond to vehicle 100. In this example, roof-top sensor housing 310 and dome sensor housing 312 may include a LIDAR sensor as well as various cameras and radar units. In addition, sensor housing 320 located at the front end of vehicle 100 and sensor housings 330, 332 on the driver's and passenger's sides of the vehicle may each store a LIDAR sensor. For example, sensor housing 330 is located in front of driver door 334. Vehicle 100 also includes sensor housings 340, 342 for radar units and/or cameras also located on the roof of vehicle 100. Additional radar units and cameras (not shown) may be located at the front and rear ends of vehicle 100 and/or on other positions along the roof or roof-top sensor housing 310.

Figure 3B:
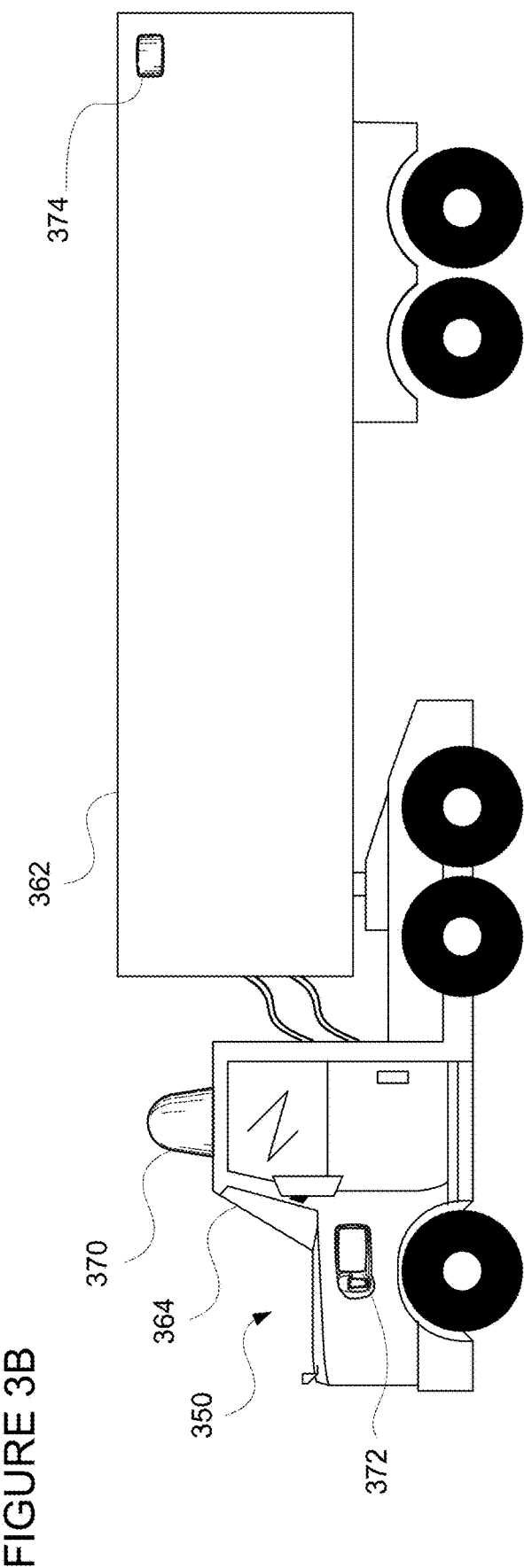
Figure 3C:
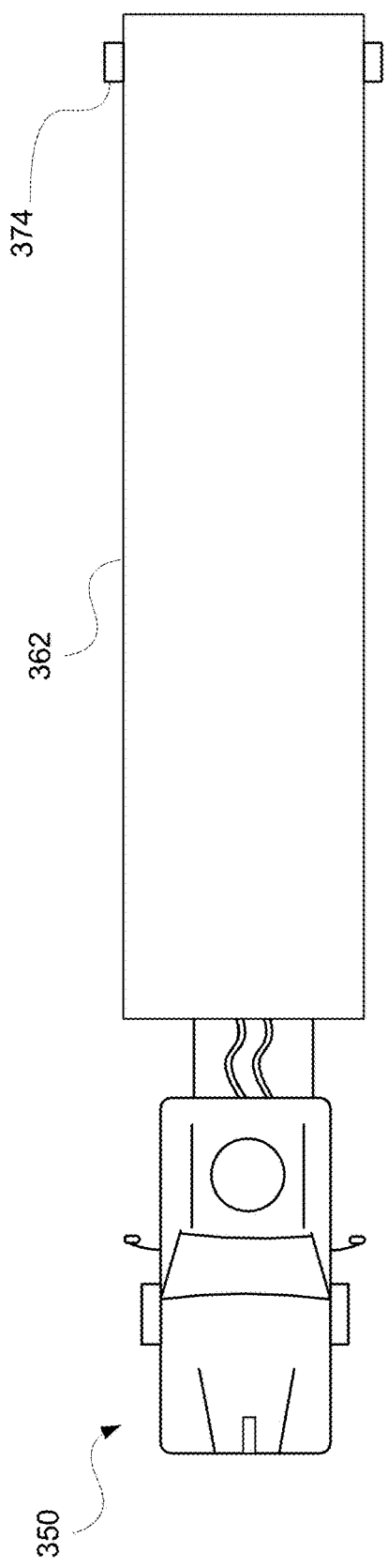

FIGS. 3B and 3C are example external views of a vehicle 350, such as a tractor-trailer truck, which may correspond to vehicle 100. The truck may include, e.g., a single, double or triple trailer, or may be another medium or heavy-duty truck such as in commercial weight classes 4 through 8. As shown, the truck includes a tractor unit 360 and a single cargo unit or trailer 362. The trailer 362 may be fully enclosed, open such as a flat bed, or partially open depending on the type of cargo to be transported. The tractor unit 360 includes the engine and steering systems (not shown) and a cab 364 for a driver and any passengers. In a fully autonomous arrangement, the cab may not be equipped with seats or manual driving components, since no person may be necessary.

As shown, the tractor unit 360 may have one or more sensor housings 370, 372 disposed there along. For instance, a dome sensor housing 370 may be disposed on a roof or top portion of the cab 364, and one or more side sensor housings 372 may be disposed on left and/or right sides of the cab. Sensor housings may also be located along other regions of the cab 364, such as along the front bumper or hood area, in the rear of the cab, adjacent to the fifth-wheel, underneath the chassis, etc. The trailer 362 may also have one or more sensor housings 374 disposed there along, for instance along a side panel, front, rear, roof and/or undercarriage of the trailer 362. As with the vehicle 300, the sensor housings 370, 372, 374 may include LIDAR sensors, sonar, radar, cameras and/or any other detection devices that record and generate sensor data.

In order for an autonomous vehicle to react to objects at very large distances, or rather those beyond the range of forward-facing and/or 360-degree LIDAR, the vehicle's perception system may utilize one or more high-resolution cameras to capture images. In this regard, such cameras may be located within roof-top sensor housing 310, dome sensor housing 312, 370, or any other housings that would be appropriate for a camera. Using the example of highway driving above, in order to be able to effectively detect objects and allow an autonomous vehicle to respond to them, e.g. by changing lanes for a vehicle stopped on a shoulder area etc., the camera may be selected such that the resolution of the camera allows the autonomous vehicle's perception system to reliably detect such objects at distances as far as or even further than 300 meters away from the autonomous vehicle.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168.

The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. The trajectory may include a geometry component and a speed component. The geometry component may be determined based on various factors including the route from the routing system. The speed component may be determined using an iterative process using a plurality of constraints. The constraints may be based on the predicted trajectories of other objects detected in the vehicle's environment (e.g. the vehicle must not come too close to these other objects) as well as characteristics of the vehicle and other limits, such as a maximum allowable deceleration limit. The planning system may attempt to determine a speed profile by starting with a fastest allowable speed which may then be reduced in order to satisfy all of the constraints of the set of constraints. If the planner system is unable to find a solution, the maximum allowable deceleration limit (and/or other constraints) may be adjusted until a solution is found.

The resulting trajectory may then be used to control the vehicle. For example, a control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 9:
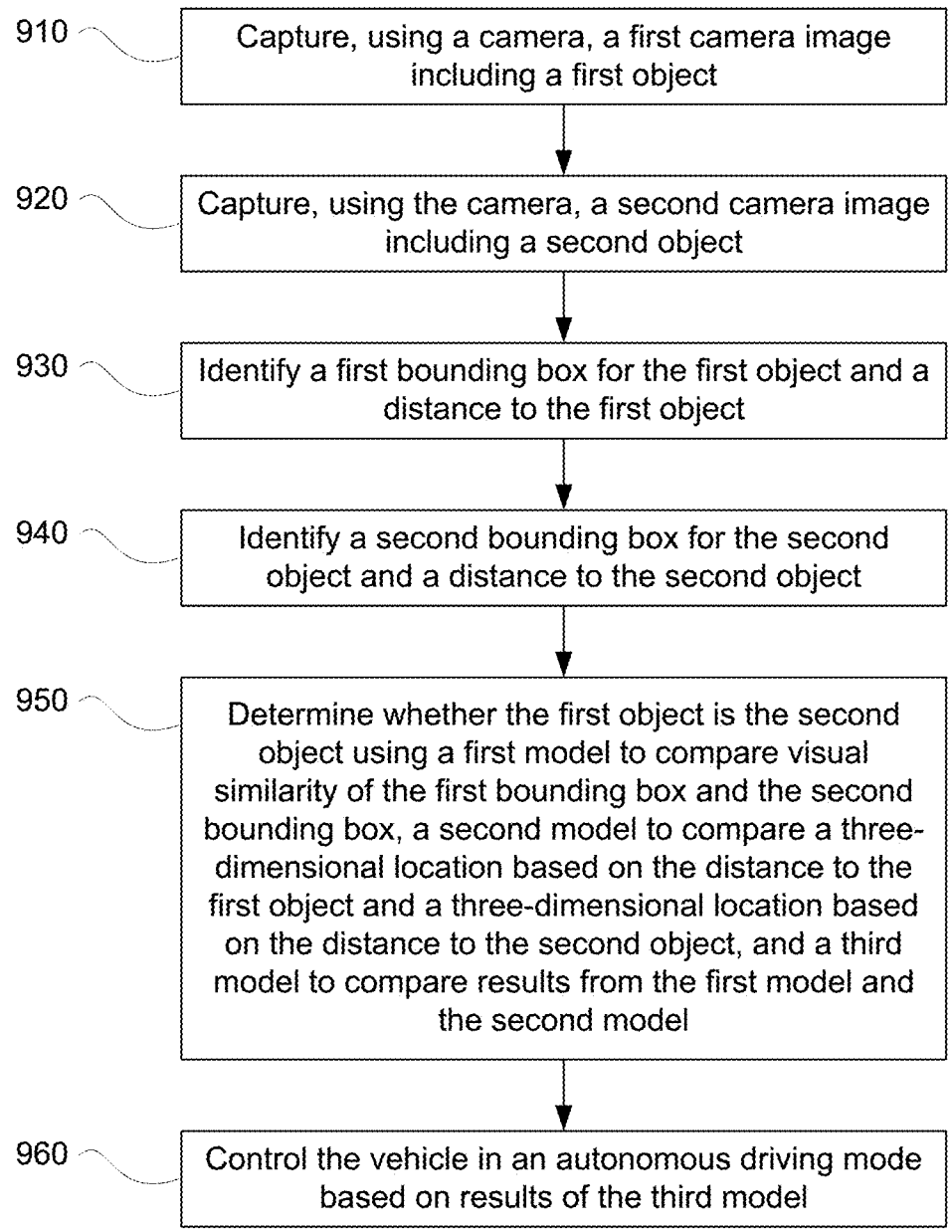
FIG. 9 is an example flow diagram in accordance with aspects of the disclosure.

FIG. 9 is an example flow diagram 900 for conducting pullover maneuvers for autonomous vehicles, which may be performed by one or more processors of one or more computing devices, such as the processors 120 of the vehicle 100. At block 910, a first camera image including a first object is captured using a camera, and at block 920, a second camera image including a second object is captured using the camera.

As vehicle 100 moves through its environment, the sensors of the perception system may capture images of the vehicle's surroundings or environment. For instance, first and second camera images may be captured by the same camera at a different point in time. For example, the second camera image may be captured subsequent to the first image. The same camera, such as the high-resolution camera discussed above, may be used to capture both the first and the second camera image.

Figure 4:
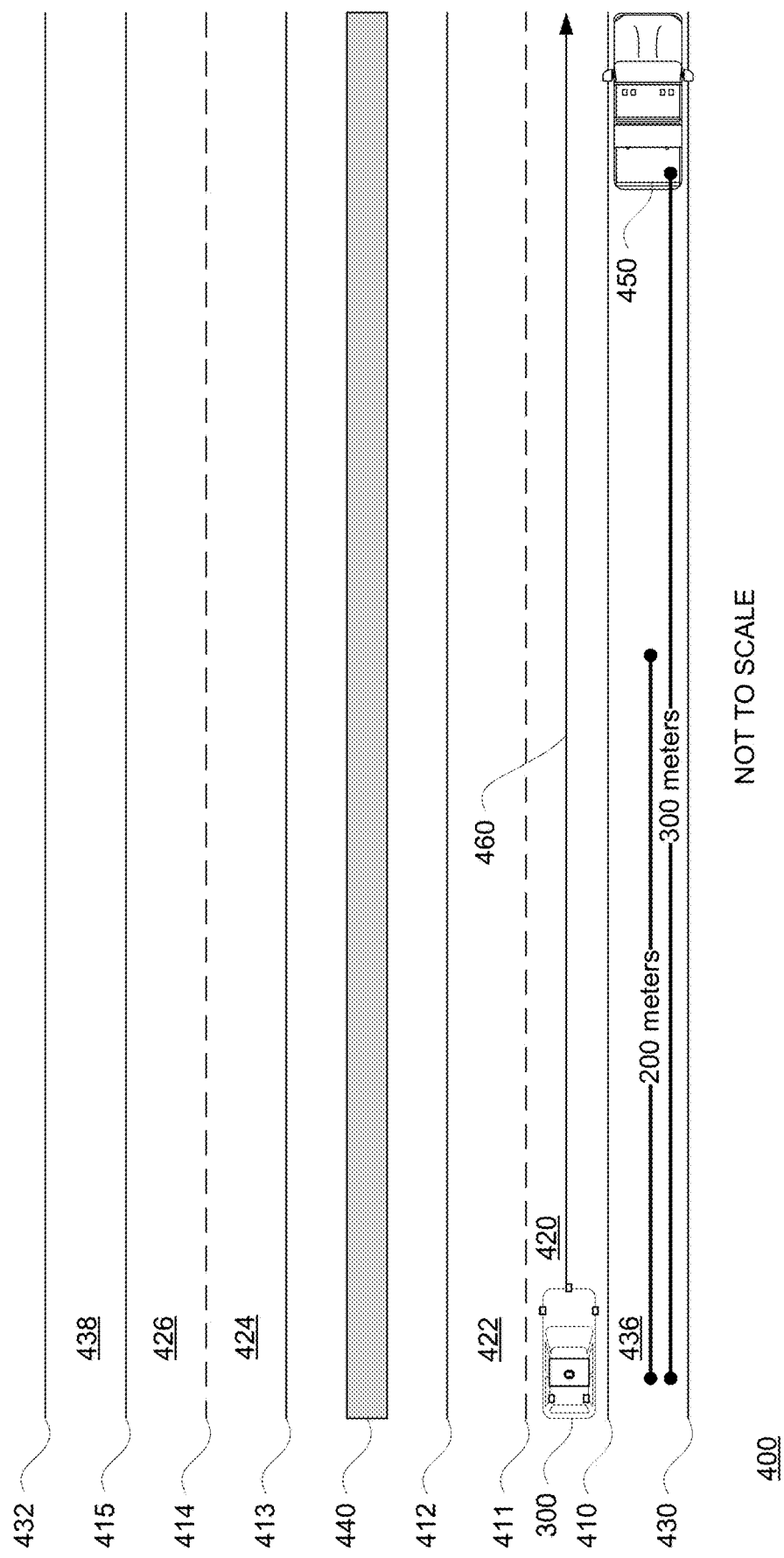
FIG. 4 is an example bird's eye view of a vehicle driving on a section of roadway and data in accordance with aspects of the disclosure.

FIG. 4 is an example bird's eye view of a vehicle 300 (which alternatively could be vehicle 350), driving on a section of roadway 400 corresponding to the map information 200. In this example, the shape, location, and other characteristics of lane lines 210, 211, 212, 213, 214, 215 correspond to the shape, location, and other characteristics of lane lines 410, 411, 412, 413, 414, 415, the shape, location, and other characteristics of lanes 220, 222, 224, 226 correspond to the shape, location, and other characteristics of lanes 420, 422, 424, 426, the shape, location, and other characteristics of road edges 230, 232 correspond to the shape, location, and other characteristics of road edges 430, 432, the shape, location, and other characteristics of shoulder areas 236, 238 correspond to the shape, location, and other characteristics of shoulder areas 436, 438, and the shape, location, and other characteristics of median 240 correspond to median 440.

In this example, the vehicle 300 is driving west in lane 420 (corresponding to lane 220) and following a trajectory 460. Trajectory 460 has the vehicle 300 passing by a vehicle 450 (e.g. a pickup truck). For ease of understanding, distances represented in this example are not to scale. In this example, the range of a forward-facing LIDAR sensor may be about 200 meters (again not to scale), and the range of a forward-facing high-resolution camera may be about 300 meters (again not to scale). In this example, the vehicle 450 is parked on the shoulder area 436 at a distance of just under 300 meters from the sensor housing 312, which as noted above, may store a high-resolution camera that can reliably detect and identify objects at about 300 meters.

Figure 5A:
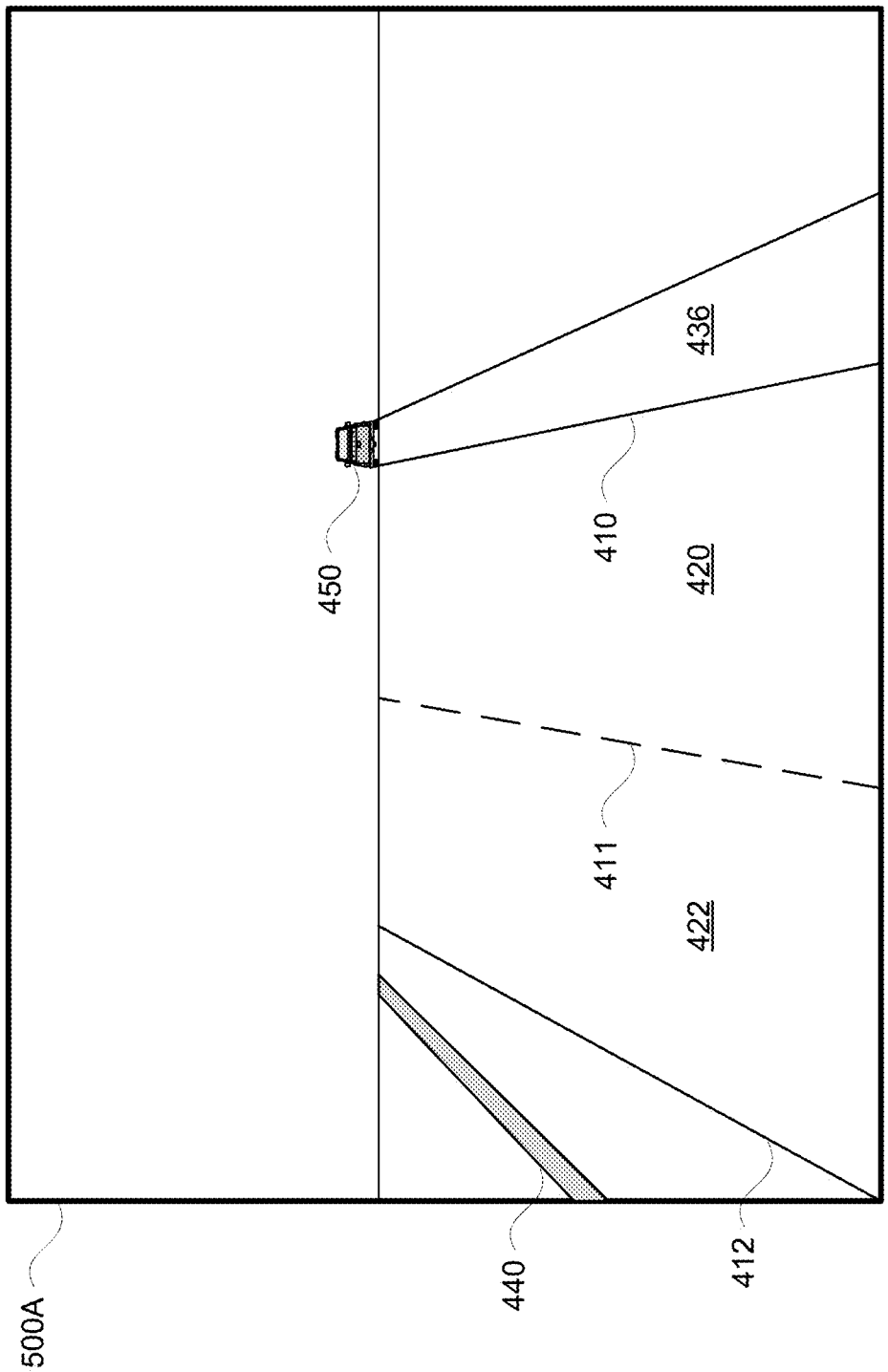
FIGS. 5A and 5B are example camera images in accordance with aspects of the disclosure.
Figure 5B:
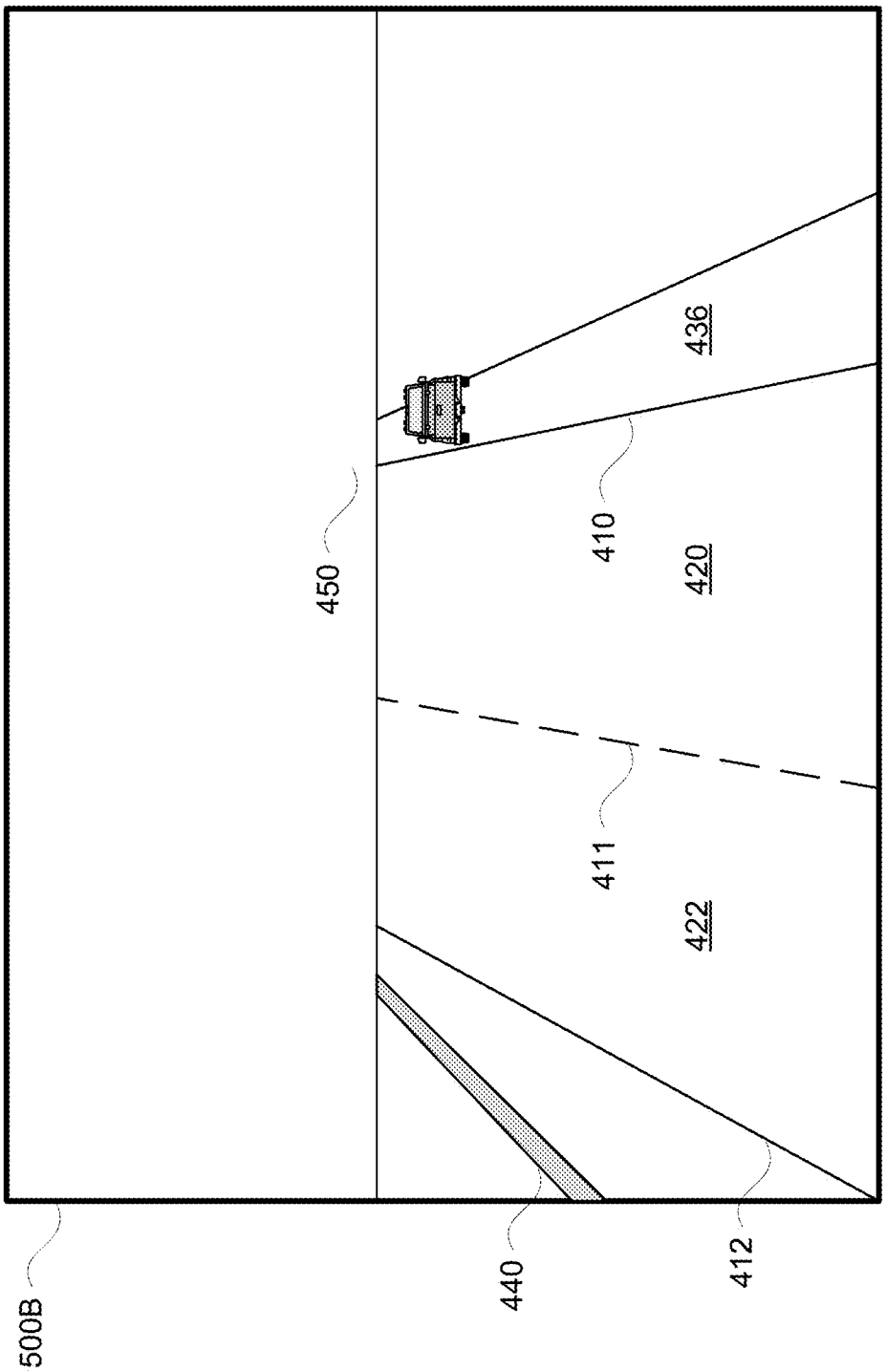

FIGS. 5A and 5B are examples of a first camera image 500A and a second camera image 500B which each include features of the section of roadway 400 as well as the vehicle 450. The first camera image 500A may have been captured by the high-resolution camera of vehicle 300 at the time of the relative distances of the vehicle 300 and vehicle 450 depicted in FIG. 4. The second camera image 500B may have been captured by the high-resolution camera of vehicle 300 at some point after the time of the relative distances of the vehicle 300 and vehicle 450 depicted in FIG. 4 when vehicle 300 is closer to vehicle 450.

At block 930, a first bounding box for the first object and a distance to the first object is identified, and at block 940, a second bounding box for the second camera image and a distance to the second object is identified. These first and second camera images may be input into an object identification model which outputs 2D bounding boxes for objects as well as a predicted depth of the object in the image. This predicted depth of an object may be in camera space, that is a local coordinate system of the camera. The camera's intrinsic and extrinsic values, such as focal length, aperture size, position and rotation of the camera relative to the vehicle, etc. as well as the location of the vehicle when the image was captured, may then be used to concert this depth into a 3D location for the object. The object identification model may be a deep learning model which is trained on examples of labeled bounding boxes for objects (training output) and known distances for those objects (training outputs) in images (training inputs). In this regard, detection of objects is performed on a per-image basis. Moreover, in some instances, the object identification model may be trained only to identify specific types of objects, such as vehicles and/or debris.

Figure 6A:
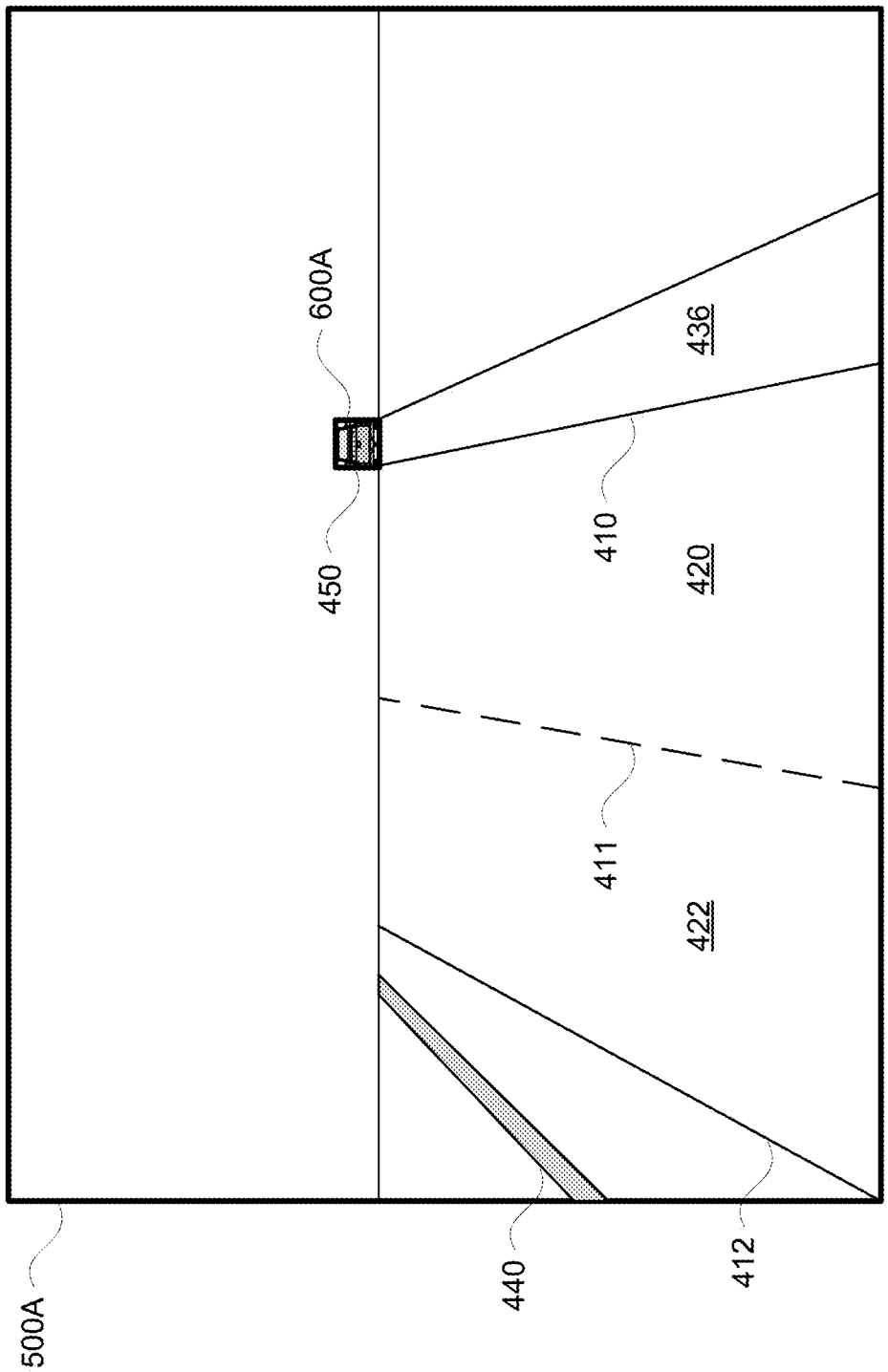
FIGS. 6A and 6B are example camera images and data in accordance with aspects of the disclosure.
Figure 6B:
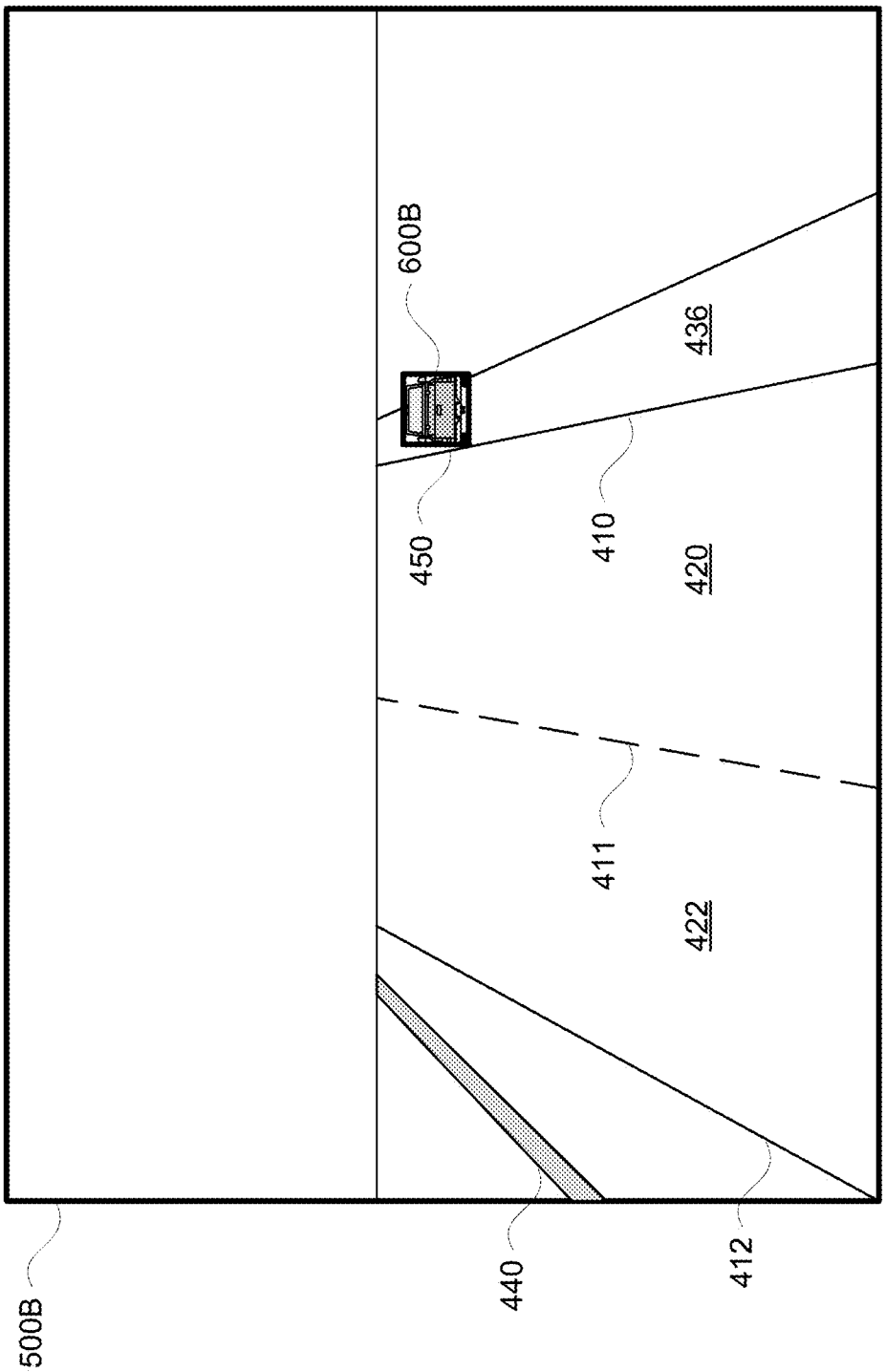

For example, FIG. 6A is an example of the first camera image 500A with a first bounding box 600A around the vehicle 450. As noted above, the computing devices may also identify a distance between the high-resolution camera and the vehicle 450 at the time the first camera image 500A was captured and associate this distance with the first camera image. Similarly, FIG. 6B is an example of the second camera image 500B with a second bounding box 600B around the vehicle 450. Again, the computing devices may also identify a distance between the high-resolution camera and the vehicle 450 at the time the second camera image 500B was captured and associate this distance with the second camera image.

Given the importance of detecting objects at longer ranges in order to give the vehicle sufficient time to respond, for example by changing lanes, the object identification model may be continuously used. That is, the detection process need not be triggered by a particular event. Alternatively, the object identification model may be used only in certain situations such as when an autonomous vehicle is on a certain type of road (e.g. a highway) and/or operating at certain speeds (e.g. greater than 45 miles per hour).

Returning to FIG. 9, at block 950, whether the first object is the second object is determined using a first model to compute visual similarity for the two bounding boxes, a second model to compare a three-dimensional location based on the distance to the first object and a three-dimensional location based on the distance to the second object, and a third model to compare results from the first model and the second model. Once objects are identified, they may be tracked over time between camera images. In order to identify which objects should be tracked as the same object, a bounding box of an object from a first image, that is the portion of the first image within the bounding box, may be compared to a bounding box of an object from a second camera image. In this regard, the portion of the first camera image 500A within the first bounding box 600A may be compared to the portion of the second camera image 500B within the second bounding box 600B.

If the two objects from the two different images are similar enough, these objects may be tracked together as the same object, or a single, tracked object. In this regard, if the result of the comparisons of the portion of the first camera image 500A within the first bounding box 600A may be compared to the portion of the second camera image 500B within the second bounding box 600B indicate that the bounding boxes correspond to the same object, here vehicle 450, these objects may be tracked together as the same object or a single tracked object.

Tracking an object may involve capturing and storing a "track" for the object including characteristics generated by the various models such as changes in the object's location, speed, acceleration, etc. over time. In this regard, tracking an object may include data association as well as state estimation. Data association may include assigning new incoming detections of the same object to existing tracks for an object or determining that these new incoming detections of an object belong to a previously undetected object and should be tracked as a new object. State estimation may include estimating characteristics of the object such as location, velocity, and acceleration from a sequence of sensor data for a given tracked object. Although initially this may include data association and/or state estimation between two camera images captured by the same camera, as indicated below, filtering techniques may be used to include information from detections of the same object detected using other cameras as well as other types of sensors (e.g. LIDAR, sonar, radar, etc.).

The aforementioned comparisons may be made between the first and/or the second camera image and later captured images from the same camera in order to add or update the characteristics of the track for the object. The comparisons may involve utilizing a plurality of models. A first similarity model may be used to compute a visual similarity embedding for the portions or patches of the images (image patches) within the two bounding boxes. As an example, a pair of input embeddings each representative of one of the image patches may be input into the first similarity model which then processes the input embeddings and outputs a visual similarity embedding. The different embeddings may be configured as vectors with values, such as discrete values, floating point or other values, representative of different information. In some instances, these embeddings may be compared using cosine similarity or dot product to compute a similarity between the two embeddings. This may provide a similarity value or distance value between two embeddings and can be used as a proxy to estimate the similarities between the objects corresponding to the bounding boxes represented by the embeddings. Similar approaches may be used to compute similarities between two sets of embeddings. In addition, using the cosine similarity may provide an efficient and fast way to compute similarity using these embeddings, though more complex approaches, such as neural nets and other machine learning approaches may also be used.

The first similarity model may be a convolutional neural network (CNN) or some other machine learned model. The first similarity model may be trained on a dataset that includes pairs of image patches. These image patches from bounding boxes for objects identified in consecutive camera frames from the same camera (or potentially different cameras). Specifically, the pairs may include positive pairs and negative pairs. In this regard, positive pairs may include two image patches that correspond to the same object as observed in consecutive frames. The negative pairs may include two image patches that correspond to different objects in consecutive frames. The first similarity model may then be trained using these pairs as well as a contrastive loss that encourages the model to predict visual similarity embeddings that are similar for image patches that correspond to the same physical object and to predict embeddings that are dissimilar (small cosine similarity value) for image patches that correspond to different physical objects. For instance, using cosine similarity as a similarity measure, embeddings for image patches corresponding to the same object would have larger cosine similarity values (e.g. closer to 1), and embeddings for different objects would have smaller cosine similarity values (e.g. closer to 0).

A second similarity model may be used to compute a geo-motion embedding for the features of objects of the bounding boxes, such as their 3D location (determined as described above). As an example, a pair of input embeddings each representative of the features of the object of one of the bounding boxes may be input into the second similarity model which then processes the input embeddings and outputs a geo-motion embedding which encodes the similarity of the measurements from a 2D/3D geo-motion perspective. In other words, this geo-motion embedding may represent the similarity of non-visual features (e.g. non-visual similarity). Again, the embeddings may be configured as vectors with values, such as discrete values, floating point or other values, representative of different information. Other features of objects which may be incorporated into the input embeddings and compared using the second similarity model may include the 2D distance from the camera to the object, 2D intersection over union (IoU) of two bounding boxes (e.g. if two boxes are perfectly overlapping, the value is closer to 1, if two boxes do not overlap, the value is closer to 0, the characteristics of the 2D bounding boxes (dimensions, shape, pose, etc.), distance between bounding box centers, and so on.

The embeddings generated from the first and second similarity models may then be input into a third similarity model in order to generate a value indicative of the similarity of objects of bounding boxes from different images. For instance, the visual similarity embedding generated by the first similarity model may be fused with the geo-motion embedding generated by the second similarity model. This may be performed, for instance by concatenating the embeddings or alternatively sending them into another machine learning model to learn to fuse them into a single embedding. The fused embedding may be input into a third similarity model.

The third similarity model may be a machine learned distance net which can output a value representative of the similarity of the two identified objects represented by the fused embedding. The value output by the third similarity model may be a value, for example, on a range of 0 to 1, where 0 is not similar and 1 is the same. In such instances, the value may be compared to a threshold to determine whether the objects are "similar enough" to be tracked as a single object. The threshold may be hand tuned depending upon precision and recall goals for the comparisons. Alternatively, the value output by the third similarity model may be a binary value (e.g. 0 or 1, where 0 is not similar and 1 is the same). If the bounding boxes and features of the objects are similar enough, the second camera image may then be used to determine additional features such as speed, velocity, heading, and acceleration which can be incorporated into the geo-motion embeddings from the second model and thereby also used as input into the third similarity model (for instance when comparing a new image to a track as discussed further below). If two objects are not similar enough, these may be considered different objects, but may still be tracked objects.

The second and third similarity models may be multilayer perceptron models (MLP) which can compare both visual similarity as well as geometry or motion similarity or some other machine learned model. These models may be trained together or separately or may be optimized using a cross-entropy loss or a contrastive loss approach.

Although the examples herein relate to comparing two images, a similar approach may be used to compare a new image to a track for an object. In this regard, the process may involve determining whether an object identified in a new image is an object that is already being tracked in the track. In these instances, the other features of the input embeddings for the second similarity model may include motion values such as speed, velocity, heading, acceleration, etc. given the timestamps of the image being compared to the track. When such values are not available, such as when comparing two images (rather than a new image and a track) as in the examples above, these values may be set to zero.

Figure 7:
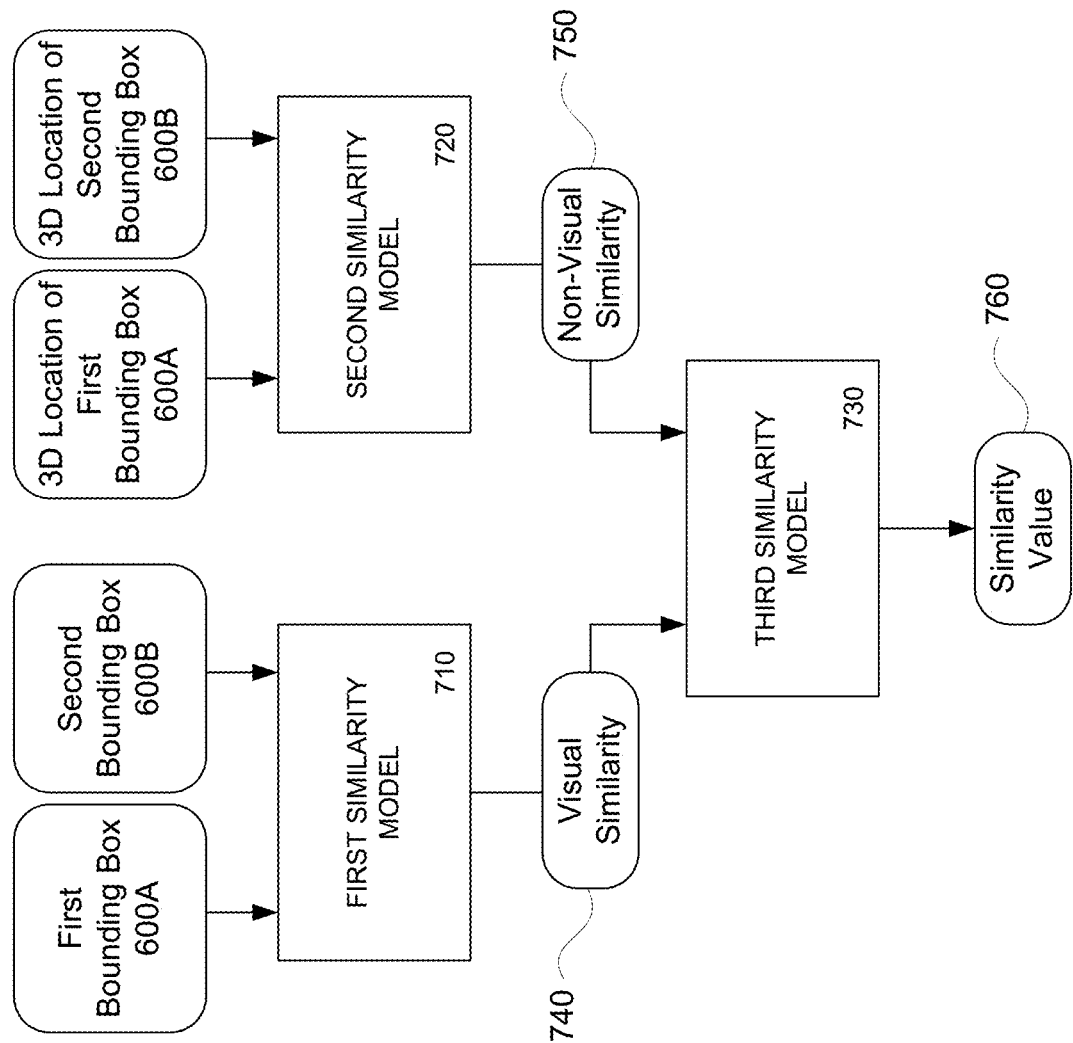
FIG. 7 is an example abstract representation of using models for processing data in accordance with aspects of the disclosure.

FIG. 7 is an abstract representation of the inputs and outputs of the first similarity model 710, second similarity model 720, and third similarity model 730. In this example, the portion of the first camera image 500A corresponding to the first bounding box 600A and the portion of the second camera image 500B corresponding to the second bounding box 600B are input into the first similarity model 710. The first similarity model 710 outputs a visual similarity embedding 740 representing a visual similarity of the bounding boxes. At or about the same time, the features of the portion of the first camera image 500A corresponding to the first bounding box 600A and the portion of the second camera image 500B corresponding to the second bounding box 600B are input into the second similarity model 720. The second similarity model 720 outputs a geo-motion embedding 750 representing a non-visual similarity of the bounding boxes (e.g. the similarity of their 3D locations). The visual similarity embedding and the non-visual similarity embedding may then be fused and input into the third similarity model 730 which outputs a similarity value 760.

Returning to FIG. 9, at block 960, the vehicle is controlled in an autonomous driving mode based on results of the third model. The perception system may publish the track to other systems of the autonomous vehicle. For instance, the perception system may publish an identifier of the object and its characteristics (generated from the camera and/or other sensors) to other systems of the autonomous vehicle. For example, the information published by the perception system may be input into a behavior modeling system in order to generate a behavior prediction for the object. In addition, the autonomous vehicle's planner system may use the information published by the perception system as well as the behavior predictions to respond to the object. As such, the vehicle may actually begin to respond to an object detected using a long-range camera before the object has even been detected by other sensors, such as LIDAR or radar sensors, of the vehicle.

In some instances, a filter-based algorithm may also be employed to identify common objects detected using different types of sensors, such as cameras, LIDAR sensors and radars. Of course, as noted above, at certain distances, LIDAR and radar data may not actually be available. However, once available, the filter can be used to identify whether a tracked object from the camera images (as described above) and its characteristics (location, heading, speed, changes over time, etc.) is actually the same as another tracked object from LIDAR, radar or other sensors. As an example, the filter may include an unscented Kalman filter in combination with an interacting multiple models (IMM) algorithm or other object tracking algorithms. In this regard, different "tracks" for the same object generated by different sensors (e.g. camera tracks, LIDAR tracks, radar tracks, etc.) can be provided with a common identifier or some other information in order to identify their relationship (e.g. that they are the same object).

Again, this information may also be published by the perception system to other systems of the autonomous vehicle. As noted above, the information published by the perception system may be input into a behavior modeling system in order to generate a behavior prediction for the object. In addition, the autonomous vehicle's planner system may use the information published by the perception system as well as the behavior predictions to respond to the object.

In order to detect and identify objects at larger distances which may require the vehicle to change lanes as in the example above, a classifier may be used to determine whether a tracked object is a vehicle stopped on a shoulder area. The classifier may utilize not only tracks from the camera images but also tracks from other sensors such as LIDAR or radar once they become available (or rather are identified using the filter discussed above). For example, the tracks for an object may be stored as an embedding which can be input into the classifier. Where there is no data for a particular type of sensor (e.g. no LIDAR tracks or radar tracks) the values for these fields in the embedding may be zero. As an example, the classifier may attempt to identify objects that are (1) located on an area corresponding to a shoulder area in pre-stored map information and (2) are not moving (e.g. appear to be stationary). In this regard, the classifier may also use local map information (e.g. the map information 200) as input. The classifier may output a value indicative of how likely the object is to be a stationary vehicle on a shoulder area. This value may be compared to a threshold, and the result of the comparison may be used to control the vehicle.

The classifier may be configured as a decision tree, deep neural network or other machine learning approach. In the example of a decision tree, the classifier may be a random forest machine learning algorithm. In this regard, the embeddings representing the tracks for an object may be input into the classifier. In some instances, only embeddings representing the tracks of certain types of objects, such as vehicles of a certain size (e.g. small passenger cars or larger). The classifier may include nodes and branches that can be used to evaluate the embeddings whether or not there are tracks from sensors other than the camera. In other words, the classifier may enable the perception system of an autonomous vehicle to both take into consideration camera tracks as soon as an object is identified (e.g. beyond the range of other sensors of the perception system) as well as to also take into consideration tracks generated by other sensors as soon as they become available.

Once again, this information may be published by the vehicle's perception system to other systems of the autonomous vehicle. As noted above, the information published by the perception system may be input into a behavior modeling system in order to generate a behavior prediction for the object. In addition, the autonomous vehicle's planner system may use the information published by the perception system as well as the behavior predictions to respond to the object, for example, by changing lanes in order to abide by the rules of certain jurisdictions which require that vehicles change lanes to move away from a vehicle stopped on a shoulder area, etc. In order to change lanes, the vehicle may also need to slow down or alternatively to speed up. In some instances, if the vehicle is not able to make a lane change, the vehicle may slow down, stop and/or request assistance from a remote operator and/or if there is a driver available to take control of the vehicle, may switch to a manual driving mode. The vehicle may actually begin to implement such responses to an object such as a stopped vehicle on a shoulder area of a road by generating trajectories that will cause the vehicle to change lanes.

Figure 8:
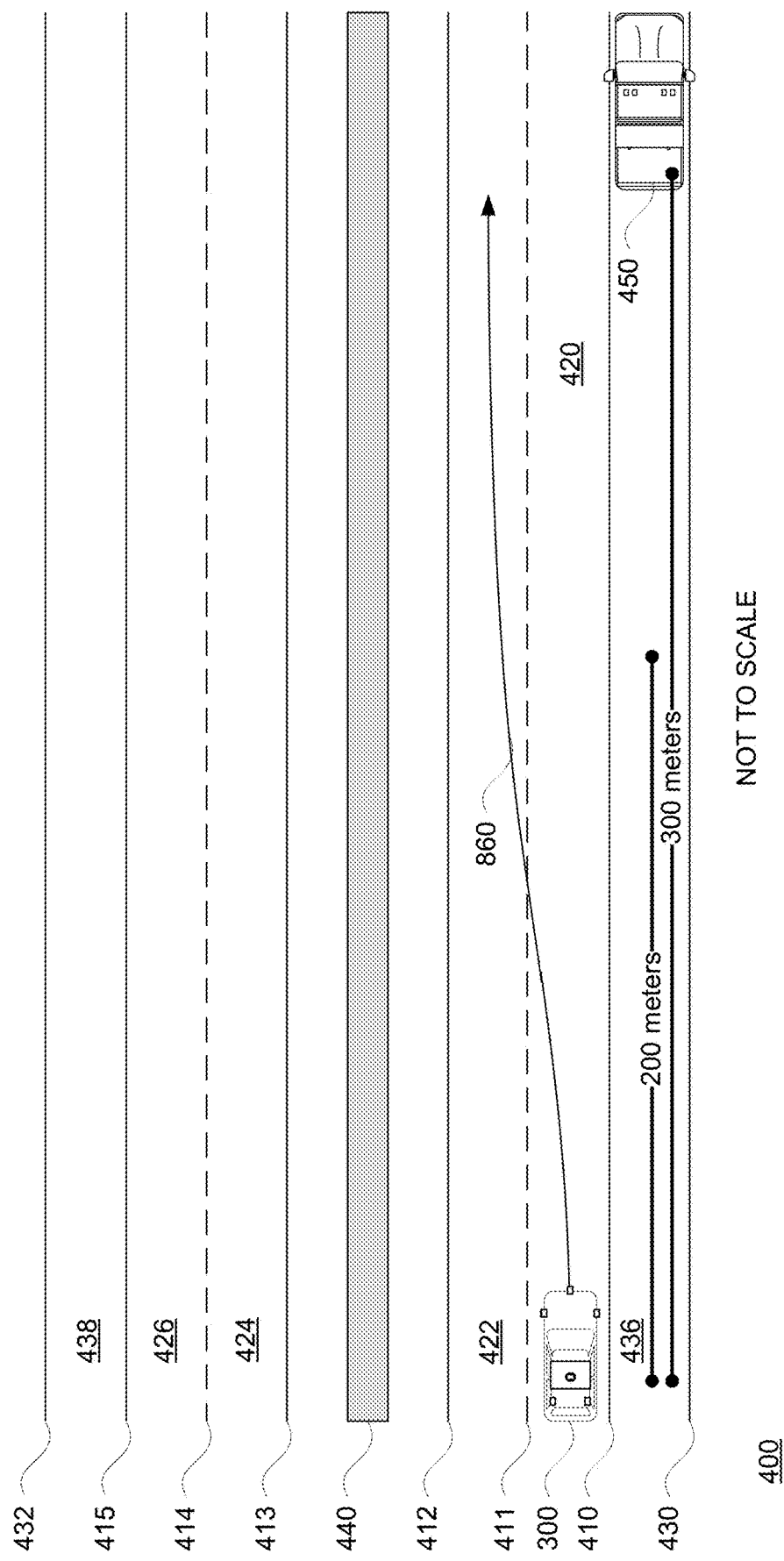
FIG. 8 is an example bird's-eye view of a vehicle driving on a section of roadway and data in accordance with aspects of the disclosure.

FIG. 8 is an example of a new trajectory 860 which the vehicle 300's planning system 168 may generate once the vehicle 450 is detected as a vehicle stopped on a shoulder area of a road in order to change lanes from lane 420 to lane 422 and move away from the vehicle 450. In some cases, the stopped vehicle may be detected using the long-range camera and such trajectories generated and used to control the vehicle before the object has even been detected by other sensors, such as LIDAR or radar sensors.

The features described herein may allow long-range detection of objects utilizing high-resolution cameras for autonomous vehicles. This may be achieved by using "camera first" detection for the initial localization and tracking of objects which can later be fused with information generated by other types of sensors. As noted above, this can be especially useful for detecting objects such as parked vehicles on a shoulder area of a road such as a highway and increasing the amount of time during which an autonomous vehicle could change lanes. In addition, the detection of a parked vehicle on a shoulder area of a road may also be used as a signal to suggest that there may be one or more pedestrians nearby and thus, an autonomous vehicle should proceed with caution when approaching. In addition, the above-discussed detection, localization, tracking and classification features may also be useful in situations where there is slow traffic ahead, for instance due to construction, a stopped vehicle, debris in the roadway, or an accident, where the autonomous vehicle would need to change lanes, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle, the method comprising:
capturing, by one or more processors, using a camera, a first camera image including a first object;
capturing, by the one or more processors, using the camera, a second camera image including a second object;
identifying, by the one or more processors, a first bounding box for the first object in the first camera image and a distance to the first object from the vehicle;
identifying, by the one or more processors, a second bounding box for the second object in the second camera image and a distance to the second object from the vehicle;
determining, by the one or more processors, whether the first object is the second object using a first model to compute visual similarity for the first bounding box and the second bounding box, a second model to compare a three-dimensional location based on the distance to the first object and a three-dimensional location based on the distance to the second object, and a third model to compare results from the first model and the second model, wherein the first, second, and third models are different models; and
controlling, by the one or more processors, the vehicle in an autonomous driving mode based on a result of the third model.

2. The method of claim 1, wherein identifying the first bounding box and the distance to the first object includes using a machine learning model.

3. The method of claim 1, wherein identifying the distance to the first object is based on only the first camera image.

4. The method of claim 1, wherein the second camera image is captured immediately after the first camera image.

5. The method of claim 1, wherein the first camera image is captured when the first object is located beyond a range of LIDAR sensors of the vehicle.

6. The method of claim 1, wherein the first camera image is captured when the first object is located beyond a range of radar sensors of the vehicle.

7. The method of claim 1, wherein controlling the vehicle further includes changing lanes in response to the result of the third model.

8. The method of claim 1, wherein the result of the third model is a value indicative of similarity of the first object and the second object, and the method further comprises comparing the value to a threshold, and wherein controlling the vehicle is further based on the comparison of the value to the threshold.

9. The method of claim 8, further comprising, based on the comparison of the value to the threshold, identifying the first object and the second object as a same object and tracking the same object over time.

10. The method of claim 8, further comprising, based on the comparison of the value to the threshold, identifying the first object and the second object as different objects and tracking the first object and the second object independently over time.

11. The method of claim 1, wherein the first model is a convolutional neural network, the second model is a multilayer perceptron model, and the third model is a multilayer perceptron model.

12. The method of claim 1, further comprising:
based on the result of the third model, generating a track for an object using the first camera image and the second camera image, the track identifying changes in the object's location over time; and determining whether the object is a stopped vehicle on a shoulder area using a classifier and the track.

13. The method of claim 12, wherein controlling the vehicle in an autonomous driving mode is further based on the determination of whether the object is a stopped vehicle on a shoulder area.

14. The method of claim 13, wherein controlling the vehicle includes causing the vehicle to change lanes to move away from the stopped vehicle.

15. The method of claim 12, further comprising:
identifying an additional track for the object generated using a LIDAR sensor; and
converting the track and the additional track into an embedding, and wherein determining whether the object is a stopped vehicle on a shoulder area further includes inputting the embedding into the classifier.

16. The method of claim 12, further comprising, converting the track into an embedding, and wherein determining whether the object is a stopped vehicle on a shoulder area further includes inputting the embedding into the classifier.

17. The method of claim 15, wherein when an additional track for the object generated using a LIDAR sensor is not available, the embedding includes a zero value for tracks generated using a LIDAR sensor.

18. The method of claim 12, wherein the track further includes speed of the object at different points in time.

19. The method of claim 12, wherein the classifier generates an output value, and the method further comprises, comparing the output value to a threshold, and wherein controlling the vehicle is further based on the comparison of the output value to the threshold.

20. The method of claim 12, wherein the classifier is a decision tree.

21. The method of claim 19, wherein the classifier is a random forest machine learning algorithm.

\* \* \* \* \*